US012673671B2

(12) United States Patent
Iguchi et al.

(10) Patent No.: US 12,673,671 B2
(45) Date of Patent: Jul. 7, 2026

(54) DRIVER ASSISTANCE DEVICE FOR VEHICLE

(71) Applicant: TOYOTA JIDOSHA KABUSHIKI KAISHA, Toyota (JP)

(72) Inventors: Naoki Iguchi, Toyota (JP); Toshiki Kinoshita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 18/929,633

(22) Filed: Oct. 29, 2024

(65) Prior Publication Data

US 2025/0178600 A1     Jun. 5, 2025

(30) Foreign Application Priority Data

Dec. 4, 2023     (JP) ................................. 2023-204820

(51) Int. Cl.
| | |
|---|---|
| *B60W 30/09* | (2012.01) |
| *B60W 30/095* | (2012.01) |
| *B60W 30/14* | (2006.01) |
| *B60W 50/00* | (2006.01) |
| *G08G 1/16* | (2006.01) |

(52) U.S. Cl.
CPC ........ B60W 30/09 (2013.01); B60W 30/0953 (2013.01); B60W 30/0956 (2013.01); B60W 30/146 (2013.01); B60W 50/0097 (2013.01); G08G 1/166 (2013.01); B60W 2555/60 (2020.02)

(58) Field of Classification Search
CPC ........... B60W 30/0959; B60W 30/146; B60W 30/0956; B60W 50/14; B60W 50/0097; B60W 2555/60; B60W 2050/146; B60W 2420/403; G08G 1/166
See application file for complete search history.

(56) References Cited

U.S. PATENT DOCUMENTS

| | | | | |
|---|---|---|---|---|
| 8,972,161 | B1 * | 3/2015 | Koebler | .................... B60T 1/10 |
| | | | | 701/123 |
| 9,105,190 | B2 | 8/2015 | Akiyama | |
| 9,393,960 | B2 | 7/2016 | Kodaira | |
| 9,483,945 | B2 | 11/2016 | Okita et al. | |
| 9,873,412 | B2 | 1/2018 | Moriizumi | |

(Continued)

FOREIGN PATENT DOCUMENTS

JP          2017-062696 A      3/2017

*Primary Examiner* — Hai H Huynh
*Assistant Examiner* — Johnny H Hoang
(74) *Attorney, Agent, or Firm* — SoraIP, Inc.

(57) ABSTRACT

A driver assist ECU executes a collision avoidance assist operation for avoiding a collision between a host vehicle and an object when a collision determination condition that is satisfied when the host vehicle is predicted to collide with the object is satisfied. The driver assist ECU recognizes a speed limit applied on a lane on which the host vehicle is traveling, and when a current speed limit that is newly recognized at a current point in time is lower than a past speed limit that had been recognized until immediately before the current point in time, changes the collision determination condition to a condition that is easily satisfied, in order for the collision avoidance assist operation to be performed at an earlier timing than when the current speed limit is not lower than the past speed limit.

4 Claims, 6 Drawing Sheets

(56)     References Cited

U.S. PATENT DOCUMENTS

| | | | |
|---|---|---|---|
| 10,543,837 B2 * | 1/2020 | Patana ................. | B60W 30/085 |
| 10,793,147 B2 | 10/2020 | Kaminade et al. | |
| 11,618,470 B2 * | 4/2023 | Oh ........................ | B60W 40/02 |
| | | | 340/435 |
| 11,634,132 B2 * | 4/2023 | Kawanai ......... | B60W 30/18163 |
| | | | 701/27 |
| 12,162,457 B2 * | 12/2024 | Oh ............................ | B60T 7/22 |
| 12,286,131 B2 * | 4/2025 | Heitzmann .......... | G06V 20/582 |
| 2015/0314790 A1 | 11/2015 | Deragarden et al. | |
| 2017/0092125 A1 | 3/2017 | Fujimaki | |
| 2021/0061309 A1 * | 3/2021 | Kawanai ............... | B60W 60/00 |
| 2021/0107521 A1 | 4/2021 | Fujita et al. | |
| 2021/0107528 A1 | 4/2021 | Fujita et al. | |
| 2021/0146956 A1 | 5/2021 | Fujita et al. | |
| 2021/0146958 A1 | 5/2021 | Tanaka et al. | |
| 2021/0197846 A1 * | 7/2021 | Thakur .................. | B60Q 1/545 |
| 2022/0289252 A1 * | 9/2022 | Liu .................. | G08G 1/096741 |
| 2025/0148912 A1 * | 5/2025 | Jacobson .............. | G01S 17/931 |

* cited by examiner

FIG. 5A

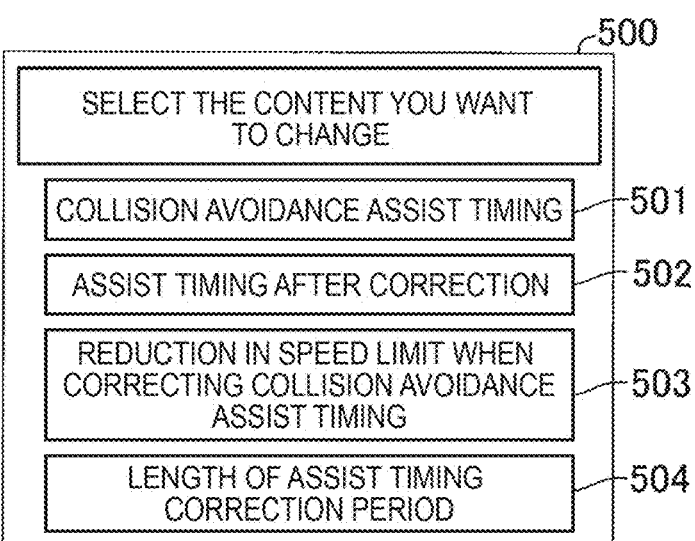

500

SELECT THE CONTENT YOU WANT TO CHANGE

COLLISION AVOIDANCE ASSIST TIMING — 501

ASSIST TIMING AFTER CORRECTION — 502

REDUCTION IN SPEED LIMIT WHEN CORRECTING COLLISION AVOIDANCE ASSIST TIMING — 503

LENGTH OF ASSIST TIMING CORRECTION PERIOD — 504

SELECT COLLISION AVOIDANCE ASSIST TIMING

EARLY — 511

NORMAL — 512

LATE — 513

FIG. 5C

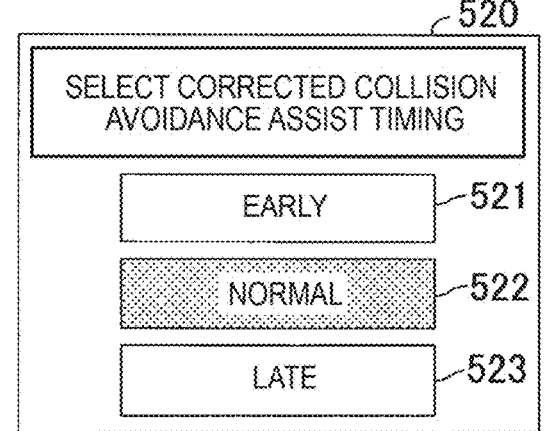

520

SELECT CORRECTED COLLISION AVOIDANCE ASSIST TIMING

EARLY — 521

NORMAL — 522

LATE — 523

FIG. 5D

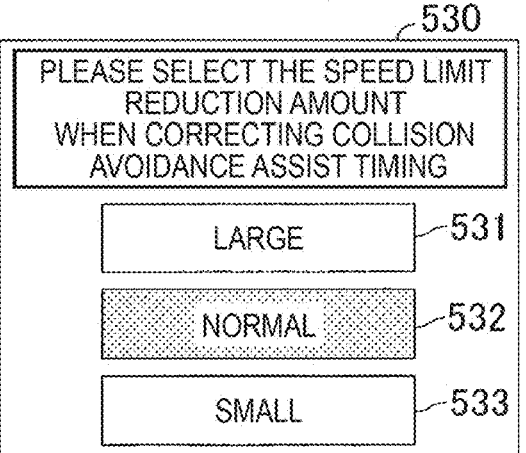

530

PLEASE SELECT THE SPEED LIMIT REDUCTION AMOUNT WHEN CORRECTING COLLISION AVOIDANCE ASSIST TIMING

LARGE — 531

NORMAL — 532

SMALL — 533

FIG. 5E

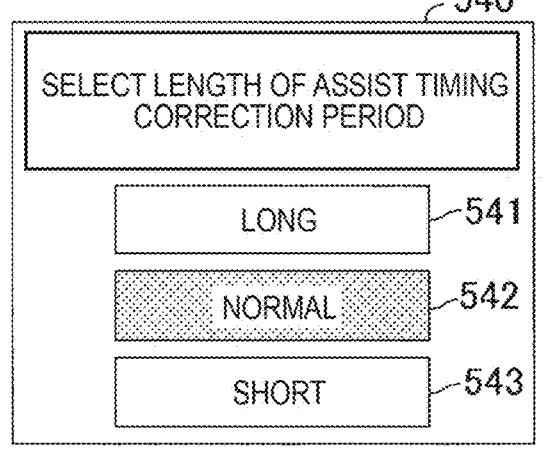

540

SELECT LENGTH OF ASSIST TIMING CORRECTION PERIOD

LONG — 541

NORMAL — 542

SHORT — 543

DRIVER ASSISTANCE DEVICE FOR VEHICLE

CROSS-REFERENCE TO RELATED APPLICATION

This application claims priority to Japanese Patent Application No. 2023-204820 filed on Dec. 4, 2023, incorporated herein by reference in its entirety.

BACKGROUND

1. Technical Field

The disclosure relates to a driver assistance device for a vehicle that performs driver assistance control for reducing a possibility of a collision between a host vehicle and an object.

2. Description of Related Art

A device in related art acquires image data by capturing an image of a scene in front of a host vehicle using an in-vehicle camera and recognizes a road sign from the image data. Further, the device in the related art extracts a speed limit (maximum speed) from the recognized road sign and notifies an occupant of the host vehicle of the speed limit (see Japanese Unexamined Patent Application Publication No. 2017-62696 (JP 2017-62696 A)).

SUMMARY

However, the device in the related art only makes a notification of the speed limit, and thus, there is a case where a driver of the host vehicle does not immediately notice that the speed limit has been changed. For example, when the speed limit largely decreases, and when a preceding vehicle largely decelerates in accordance with the decrease of the speed limit, if the driver of the host vehicle does not notice the decrease of the speed limit, a timing at which the driver applies a brake is delayed. This results in a possibility that the host vehicle may approach the preceding vehicle. The device in the related art cannot effectively leverage information regarding the recognized speed limit in such a situation.

The present disclosure has been made to solve such a problem. In other words, one of objects of the present disclosure is to provide a driver assistance device for a vehicle, the driver assistance device being capable of more effectively leveraging information regarding the recognized speed limit.

One aspect of a driver assistance device for a vehicle of the present disclosure includes a controller (10, 50, 70) configured to perform a collision avoidance assist operation (S450, S470) when a collision determination condition is satisfied (S440, S460), the collision avoidance assist operation being an operation for avoiding a collision between a host vehicle and an object, and the collision determination condition being a condition that is satisfied when the host vehicle is predicted to collide with the object.

The controller is configured to recognize a speed limit applied to a lane on which the host vehicle is traveling, and when a current speed limit is lower than a past speed limit (S250: Yes), change the collision determination condition to a condition that is easily satisfied (S290), in order for the collision avoidance assist operation to be performed at an earlier timing than when the current speed limit is not lower than the past speed limit (S250: No), the current speed limit being a speed limit newly recognized at a current point in time (S210), and the past speed limit being a speed limit that had been recognized until immediately before the current point in time.

When the speed limit that is newly recognized at the current point in time (current speed limit) is lower than the speed limit that had been recognized so far (past speed limit), a preceding vehicle is highly likely to rapidly decelerate. Thus, in the above aspect, in such a case, the collision determination condition is changed to a condition that is easily satisfied, in order for the collision avoidance assist operation to be performed at an earlier timing. More specifically, the collision determination condition is a condition that is satisfied when a collision index value indicating a possibility of a collision between the host vehicle and the object has reached a threshold. In this case, the collision determination condition can be changed to a condition that is more easily satisfied by changing the threshold or correcting the collision index value. For example, when the collision determination condition is a condition that is satisfied when a "time to collision as the collision index value" that is a time remaining until the host vehicle collides with the object becomes equal to or less than a collision determination time threshold, the collision determination condition is changed to a condition that is easily satisfied by increasing the collision determination time threshold or making a correction to decrease the time to collision.

As a result, even if a driver of the host vehicle overlooks decrease of the speed limit and is late in addressing rapid deceleration of the preceding vehicle, the collision determination condition is satisfied early, and the collision avoidance assist operation is executed early. It is therefore possible to prevent the host vehicle from extremely approaching the preceding vehicle.

In the above description, names and/or reference numerals used in the embodiment are attached in brackets to components of the disclosure corresponding to the embodiment to be described later to facilitate understanding of the disclosure. However, the respective components of the disclosure are not limited to those specified by the names and/or the reference numerals. The present disclosure covers a driver assistance method for a vehicle and a program of the driver assistance method.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5A is a view illustrating a menu screen to be displayed at a setting input device illustrated in FIG. 1;

FIG. 5B is a view illustrating a collision avoidance assist timing selection screen to be displayed at the setting input device illustrated in FIG. 1;

FIG. 5C is a view illustrating the corrected collision avoidance assist timing selection screen to be displayed at the setting input device illustrated in FIG. 1;

FIG. 5D is a view illustrating a speed limit decrease threshold selection screen to be displayed at the setting input device illustrated in FIG. 1;

FIG. 5E is a view illustrating an assist timing correction period length selection screen to be displayed at the setting input device illustrated in FIG. 1.

DETAILED DESCRIPTION OF EMBODIMENTS

A "driver assistance device DS for a vehicle (hereinafter, referred to as a "device DS")" according to an embodiment of the present disclosure includes components illustrated in FIG. 1 and is applied to (mounted on) a host vehicle HV. The host vehicle HV may be any of a vehicle using an internal combustion as a power source, a vehicle using an electric motor as a power source (that is, a battery electric vehicle), a hybrid electric vehicle, and the like.

In the present specification, an "ECU" is an electronic control unit (control unit) including a microcomputer including a CPU (processor), a ROM, a RAM, a data writable non-volatile memory, an interface, and the like. The ECU is also referred to as a controller or a computer. A plurality of ECUs illustrated in FIG. 1 is connected so as to be able to exchange information with each other via a controller area network (CAN). Some or all of the plurality of ECUs may be integrated into one ECU.

Figure 1:
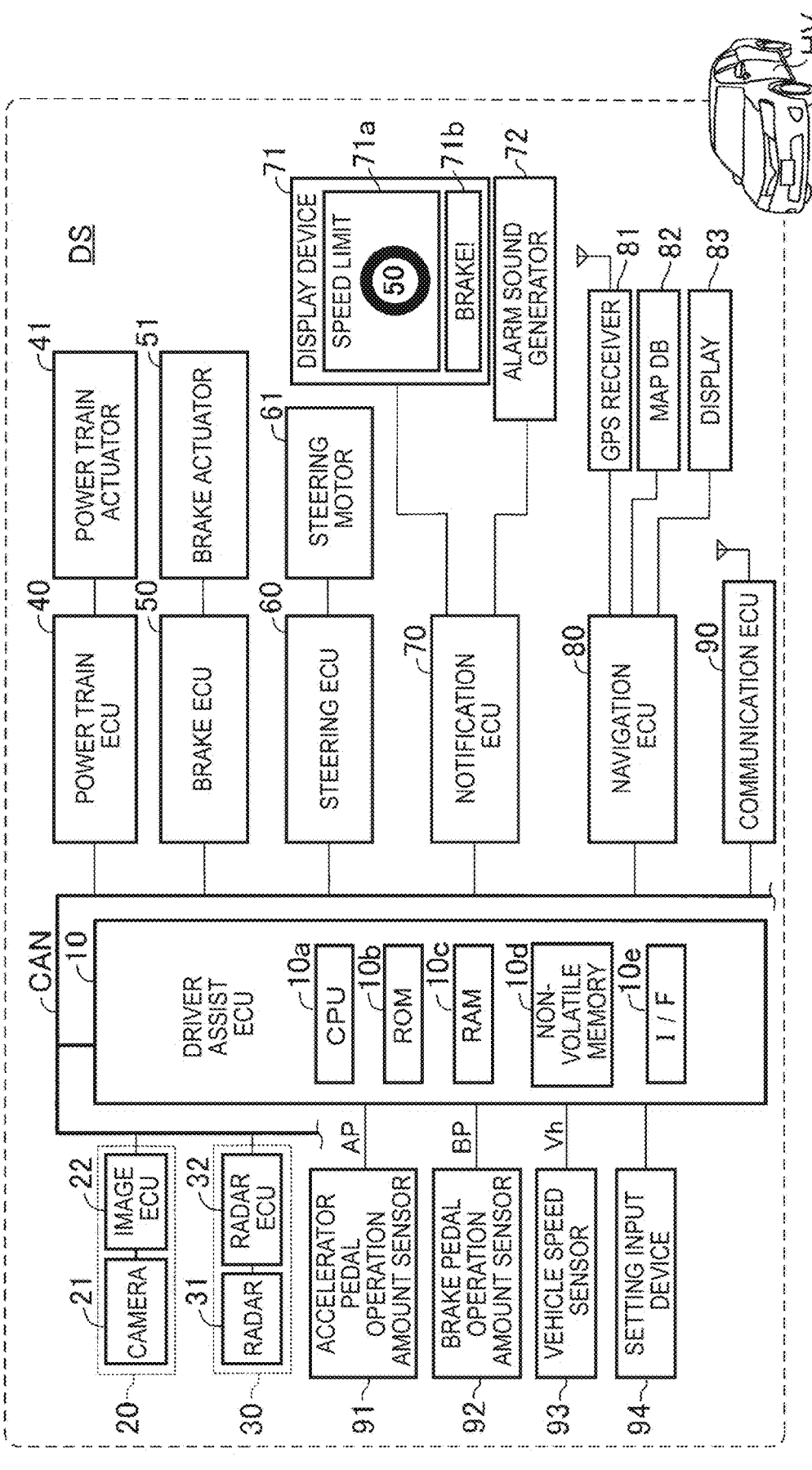
FIG. 1 is a schematic configuration diagram of a driver assistance device for a vehicle according to an embodiment of the present disclosure.

The driver assist ECU 10 executes driver assist control that is also referred to as "collision avoidance assist control or collision damage reduction control" for reducing a possibility of a collision between a host vehicle and an object (obstacle) using the components illustrated in FIG. 1.

A camera device 20 includes a camera 21 and an image ECU 22. The camera 21 captures an image of a scene in front of the host vehicle HV every time a predetermined period has elapsed to acquire image data. The image ECU 22 generates "camera information including the image data itself, camera object information and lane information" based on the image data from the camera 21 and transmits the camera information to the driver assist ECU 10.

The driver assist ECU 10 extracts a "road sign indicating a speed limit (maximum speed)" included in the image data based on the image data acquired by the camera device 20. The driver assist ECU 10 recognizes (acquires) a numerical value indicated in the road sign as the speed limit (maximum speed) set/applied to a "lane (hereinafter, also referred to as an "own lane")" on which the host vehicle HV is traveling at a current point in time". The recognition (acquisition) of the speed limit may be performed by the image ECU 22.

The radar device 30, which is a well-known device that acquires information regarding an object existing in front of the host vehicle HV using a radio wave in a millimeter waveband, includes a radar 31 and a radar ECU 32. The radar 31 transmits a millimeter wave within a predetermined detection range every time a predetermined period has elapsed and receives a millimeter wave reflected by the object. The radar 31 transmits information regarding the transmitted and received millimeter wave to and from the radar ECU 32. The radar ECU 32 acquires radar information based on the information from the radar 31 and transmits the radar information to the driver assist ECU 10. The radar information includes a distance to the object, a direction of the object, a relative speed of the object, and the like.

A power train ECU 40 controls a drive device (not illustrated) including a power source of the host vehicle HV by driving a power train actuator 41 to thereby generate drive force.

A brake ECU 50 controls a braking device (not illustrated) of the host vehicle HV by driving a brake actuator 51 to thereby apply braking force to the host vehicle HV. When the brake ECU 50 receives an instruction from the driver assist ECU 10, the brake ECU 50 executes automatic braking that automatically applies braking force to the host vehicle HV by driving the brake actuator 51.

A steering ECU 60 controls a steering device (not illustrated) of the host vehicle HV by driving a steering motor 61 to thereby change a steering angle of the host vehicle HV. When the steering ECU 60 receives an instruction from the driver assist ECU 10, the steering ECU 60 automatically changes the steering angle of the host vehicle HV (that is, executes automatic steering) by driving the steering motor 61.

A notification ECU (alarm ECU) 70 is connected to a display device 71 placed at a position at which the display device 71 can be viewed from a driver's seat and an alarm sound generator 72 that generates alarm sound (notification sound) and controls the display device 71 and the alarm sound generator 72 in accordance with an instruction (instruction signal) from the driver assist ECU 10. In the display device 71, a region 71*a* in which a speed limit (maximum speed) is displayed, and an alarm display region 71*b* in which an alarm mark that makes a notification of a risk of a collision is displayed are provided. The notification ECU 70 displays a speed limit included in the instruction from the driver assist ECU 10 in the region 71*a* and displays an alarm mark in the alarm display region 71*b* in accordance with the instruction from the driver assist ECU 10.

A navigation ECU 80 is connected to a GPS receiver 81, a map database 82 in which map information is stored, and a display touch panel 83 that displays a touch button and constitutes an in-vehicle navigation system with the GPS receiver 81, the map database 82 and the display touch panel 83. The navigation ECU 80 acquires a current position of the host vehicle HV based on a GPS signal received by the GPS receiver 81. The navigation ECU 80 can acquire the speed limit set/applied to the own lane at the current point in time based on the acquired current position of the host vehicle HV and the map information stored in the map database 82.

A communication ECU 90 can perform wireless communication with external devices (such as, for example, roadside machine and an information management center) of the host vehicle HV and acquire "various kinds of information including information regarding the speed limit" from the external devices.

The driver assist ECU 10 receives input of detection values (output values) of the following "sensors and switches".

An accelerator pedal operation amount sensor 91 that detects an accelerator pedal operation amount AP of the host vehicle HV A brake pedal operation amount sensor 92 that detects a brake pedal operation amount BP of the host vehicle HV A vehicle speed sensor 93 that detects a speed (that is, host vehicle speed) of the host vehicle HV A setting input device 94 includes a display touch panel provided at a position at which the display touch panel can be operated by the driver, the display touch panel displaying a touch button. By the driver operating the setting input device 94, a "collision determination time threshold TTCth, a collision avoidance assist control execution start timing correction time dTTCth, a magnitude of a speed limit decrease threshold VLTth for switching control, a length of a control switching period (change time threshold) Tth, and the like" which will be described later can be changed.

Outline of Actuation

The device DS acquires (recognizes) a speed limit (maximum speed) VLT of a lane on which the host vehicle HV is traveling from image data. When the speed limit VLT largely decreases, the device DS increases the collision determination time threshold TTCth for starting a collision avoidance assist operation (here, automatic braking) by an amount corresponding to the timing correction time dTTCth during a period (correction period) until a period corresponding to the change time threshold Tth has elapsed since the speed limit VLT largely decreased. In other words, the device DS changes the collision determination condition for starting the collision avoidance assist operation (automatic braking) to a condition that is more easily satisfied during the correction period.

Specific Actuation

A CPU 10a (hereinafter, simply referred to as a "CPU") of the driver assist ECU 10 executes routines indicated by flowcharts from FIG. 2 to FIG. 4 and FIG. 6 every time a predetermined period (computation period) dt has elapsed. Note that hereinafter, "step" will be expressed as "S".

Collision Determination Time Threshold Correction (Correction of Execution Start Timing of Collision Avoidance Assist Operation)

Figure 2:
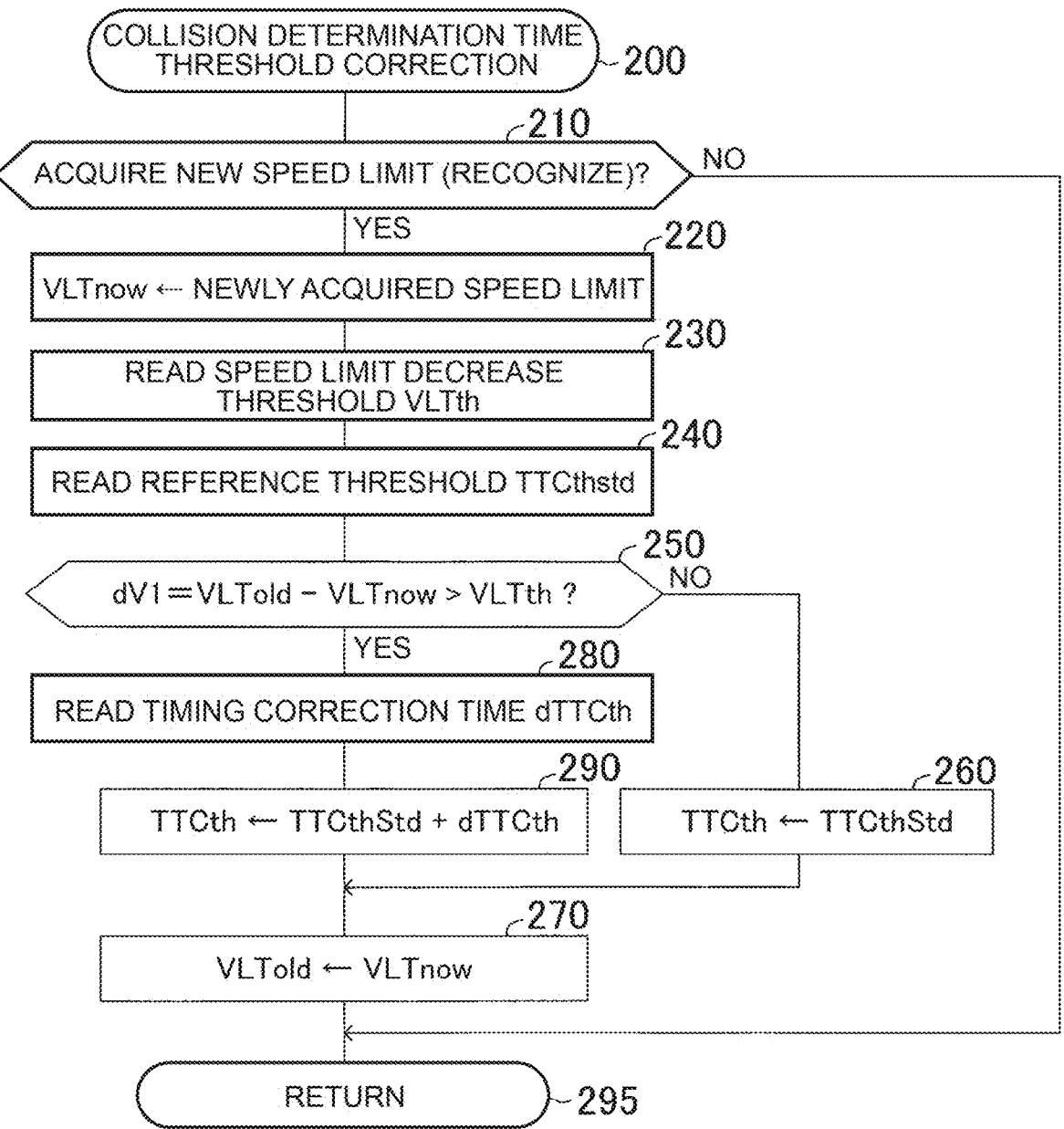
FIG. 2 indicates a routine to be executed by a CPU of a driver assist ECU illustrated in FIG. 1.

At a predetermined timing, the CPU starts processing from S200 in FIG. 2, the process proceeds to S210, and the CPU determines whether the speed limit set for the own lane is newly acquired (recognized from the image) based on the image data transmitted from the camera device 20. Note that the CPU may acquire the speed limit set for the own lane from the current position of the host vehicle HV and the map information via the navigation ECU 80.

When the speed limit is newly acquired, the process proceeds from S210 to S220, and the CPU stores the speed limit newly acquired in S210 in a RAM 10c (hereinafter, expressed as a "RAM") as a current speed limit VLTnow. In this event, the CPU changes the speed limit displayed in the region 71a of the display device 71 to the current speed limit VLTnow.

Then, the process proceeds to S230, and the CPU reads out the speed limit decrease threshold VLTth from a non-volatile memory 10d (hereinafter, expressed as a "non-volatile memory"). Then, the process proceeds to S240, and the CPU reads out a reference threshold TTCthStd from the non-volatile memory.

Then, the process proceeds to S250, and the CPU determines whether a speed limit reduction amount dV1 is greater than the speed limit decrease threshold VLTth read out from the non-volatile memory. The speed limit reduction amount dV1 is a value obtained by subtracting the current speed limit VLTnow from a speed limit in the past (past speed limit) VLTold that has been recognized to the present. In other words, the CPU determines whether the speed limit decreases by an amount greater than the speed limit decrease threshold VLTth in S230.

When the speed limit reduction amount dV1 is equal to or less than the speed limit decrease threshold VLTth (that is, when the speed limit does not decrease by an amount greater than the speed limit decrease threshold VLTth), the process of the CPU proceeds from S250 to S260. In S260, the CPU sets the reference threshold TTCthStd read out from the non-volatile memory at the collision determination time threshold TTCth and stores the threshold in the RAM. Note that S260 may be omitted. The "reference threshold TTCthStd read out from the non-volatile memory" is set at the collision determination time threshold TTCth upon startup of the host vehicle HV. Then, the process proceeds to S270, and the CPU sets the current speed limit VLTnow at the past speed limit VLTold. In other words, the CPU stores the current speed limit VLTnow stored in the RAM in S220 as the past speed limit VLTold in the RAM. Then, the process proceeds to S295, and the CPU ends the present routine once.

In contrast, when the speed limit reduction amount dV1 is greater than the speed limit decrease threshold VLTth (that is, when the speed limit decreases by an amount greater than the speed limit decrease threshold VLTth) when the process of the CPU proceeds to S250, the process of the CPU proceeds from S250 to S280. The CPU reads out the timing correction time dTTCth from the non-volatile memory in S280. Then, the process proceeds to S290, and the CPU sets a "value obtained by adding the timing correction time dTTCth to the reference threshold TTCthStd" at the collision determination time threshold TTCth and stores the threshold in the RAM. The "value obtained by adding the timing correction time dTTCth to the reference threshold TTCthStd" is also referred to as a corrected collision determination time threshold. Then, the process of the CPU proceeds to S270 and proceeds to S295.

Compensation End of Collision Determination Time Threshold

Figure 3:
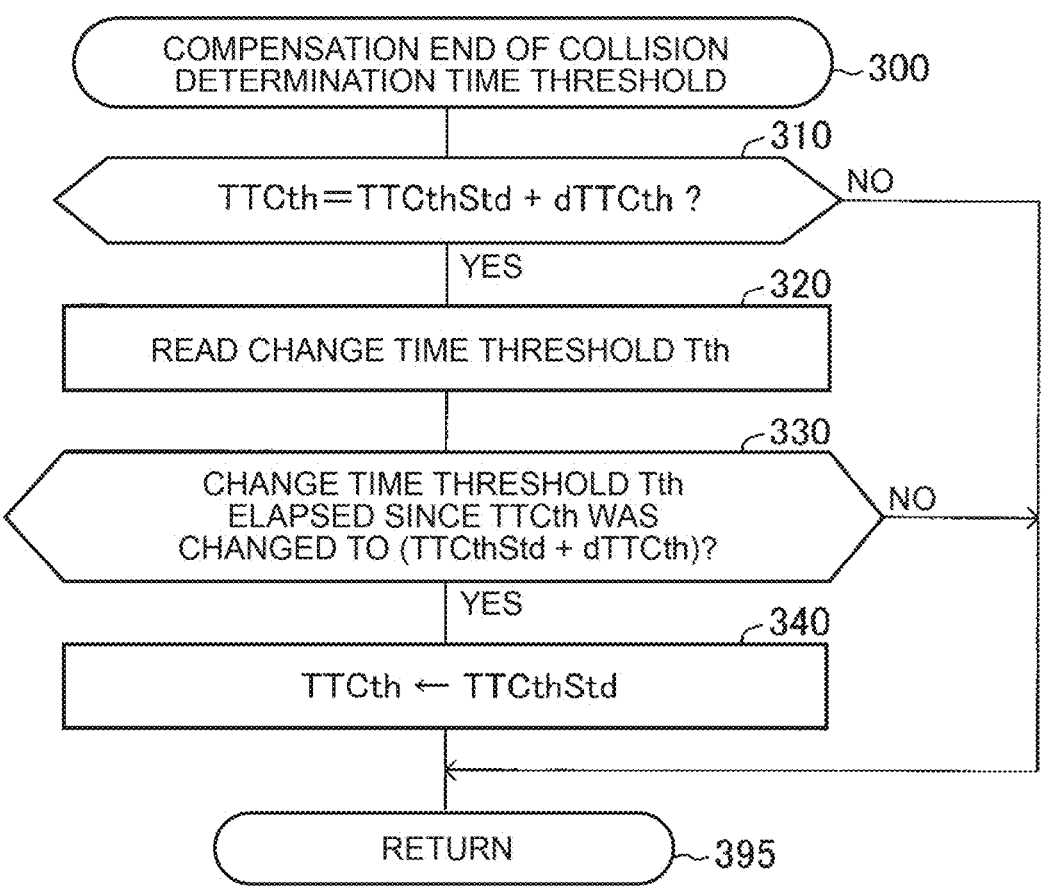
FIG. 3 indicates a routine to be executed by the CPU of the driver assist ECU illustrated in FIG. 1.

At a predetermined timing, the CPU starts processing from S300 in FIG. 3, and the process proceeds to S310. In S310, the CPU determines whether the collision determination time threshold TTCth stored in the RAM is equal to the corrected determination time threshold (that is, the "value obtained by adding the timing correction time dTTCth to the reference threshold TTCthStd") (whether the collision determination time threshold TTCth is in a corrected state).

When the collision determination time threshold TTCth is the corrected determination time threshold (=TTCthStd+dTTCth), the process proceeds from S310 to S320, and the CPU reads out the change time threshold Tth from the non-volatile memory.

Then, the process proceeds to S330, and the CPU determines whether a duration since the collision determination time threshold TTCth has been changed to the corrected determination time threshold (=TTCthStd+dTTCth) is equal to or greater than the change time threshold Tth. In other words, the CPU determines whether the change time threshold Tth has elapsed from a point in time at which the speed limit had decreased by an amount greater than the speed limit decrease threshold VLTth in S330.

When the change time threshold Tth has elapsed from the point in time at which the collision determination time threshold TTCth had been changed to the corrected determination time threshold (=TTCthStd+dTTCth), the process proceeds from S330 to S340, and the CPU sets the reference threshold TTCthStd at the collision determination time threshold TTCth. In other words, the CPU returns the collision determination time threshold TTCth to a value before the timing correction time dTTCth is added (before change). Then, the process proceeds to S395, and the CPU ends the present routine once.

Note that when the collision determination time threshold TTCth is not the corrected determination time threshold (=TTCthStd+dTTCth) (that is, when the collision determination time threshold TTCth is not corrected) when the process of the CPU proceeds to S310, the process of the CPU directly proceeds from S310 to S395.

Further, when the change time threshold Tth has not elapsed from the point in time at which the collision determination time threshold TTCth had been changed to the corrected determination time threshold (=TTCthStd+ dTTCth) when the process of the CPU proceeds to S330, the process of the CPU directly proceeds from S330 to S395. Through the process described above, the collision determination time threshold TTCth is maintained at the corrected determination time threshold (=TTCthStd+dTTCth) during a period until the change time threshold Tth has elapsed from the point in time at which the speed limit had decreased by an amount greater than the speed limit decrease threshold VLTth.

Collision Avoidance Assist Control

Figure 4:
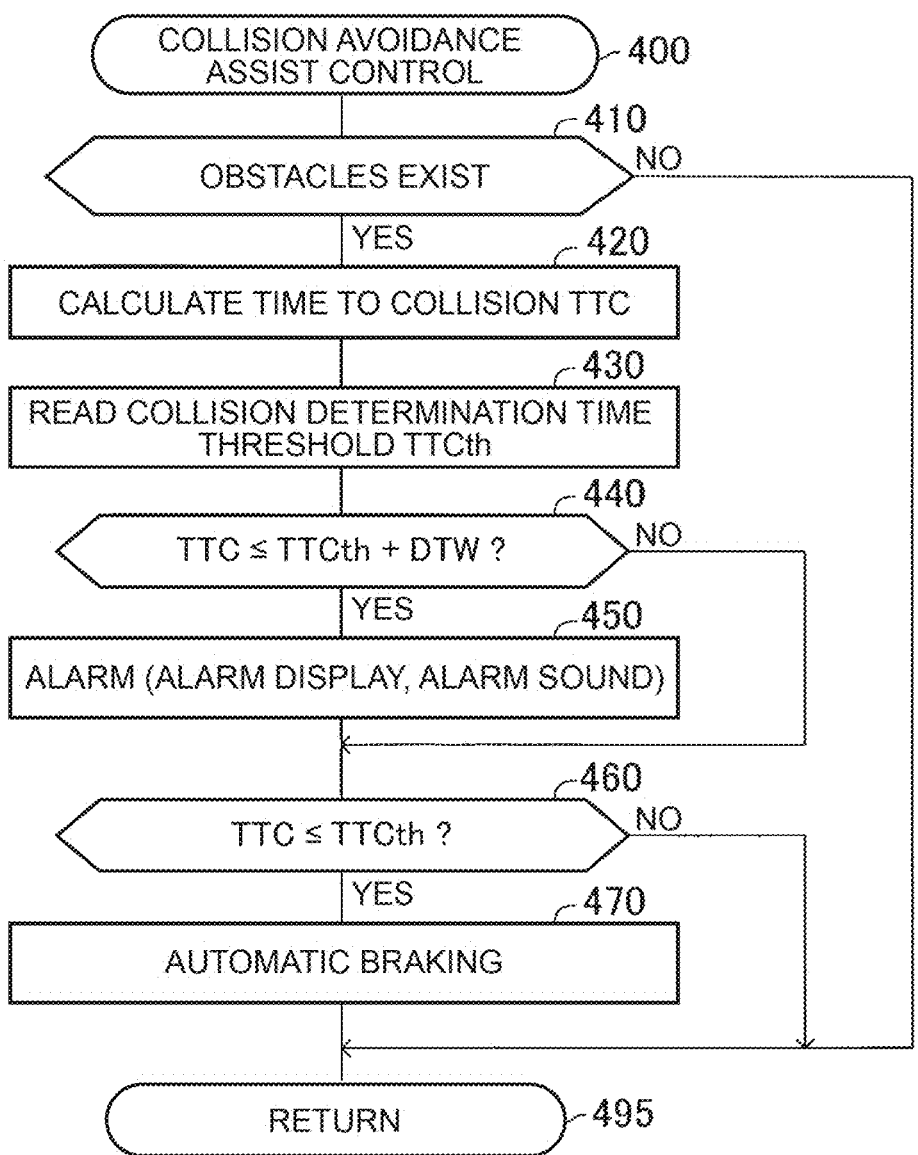
FIG. 4 indicates a routine to be executed by the CPU of the driver assist ECU illustrated in FIG. 1.

At a predetermined timing, the CPU starts processing from S400 in FIG. 4, the process proceeds to S410, and the CPU determines whether an object (obstacle) exists in a region in which the host vehicle HV is to travel within a fixed period based on the camera information and the radar information. When an object (obstacle) does not exist in the region in which the host vehicle HV is to travel within the fixed period, the process directly proceeds from S410 to S495, and the CPU ends the present routine once.

In contrast, when an object (obstacle) exists in the region in which the host vehicle HV is to travel within the fixed period, the process proceeds from S410 to S420, and the CPU calculates a time to collision TTC by dividing a distance between the obstacle and the host vehicle HV by a relative speed of the obstacle. In other words, the CPU calculates a time remaining until the host vehicle collides with the obstacle as the time to collision TTC. Then, the process proceeds to S430, and the CPU reads out the collision determination time threshold TTCth from the RAM.

Then the process proceeds to S440, and the CPU determines whether the time to collision TTC is equal to or less than a "value obtained by adding an alarm difference time DTW to the collision determination time threshold TTCth". In other words, the CPU determines whether a first collision determination condition (alarm generation condition) that is satisfied when the host vehicle is predicted to collide with the object is satisfied in S440. When the time to collision TTC is equal to or less than the "value obtained by adding the alarm difference time DTW to the collision determination time threshold TTCth", the process of the CPU proceeds from S440 to S450. In S450, the CPU displays an alarm mark in the alarm display region 71b of the display device 71 and causes the alarm sound generator 72 to generate alarm sound by transmitting an instruction signal to the notification ECU 70. Display of the alarm mark and/or generation of the alarm sound is one of the collision avoidance assist operation for avoiding a collision between the host vehicle and the object. Then, the process of the CPU proceeds to S460.

On the other hand, when the time to collision TTC is longer than the "value obtained by adding the alarm difference time DTW to the collision determination time threshold TTCth", the process of the CPU directly proceeds from S440 to S460.

The CPU determines whether the time to collision TTC is equal to or less than the collision determination time threshold TTCth in S460. In other words, the CPU determines whether a second collision determination condition (automatic braking execution condition) that is satisfied when the host vehicle is predicted to collide with the object is satisfied in S460. When the time to collision TTC is equal to or less than the collision determination time threshold TTCth, the process of the CPU proceeds from S460 to S470. In S470, the CPU executes automatic braking (automatically applies braking force to the host vehicle HV) such that the host vehicle HV stops before the obstacle by transmitting an instruction signal to the brake ECU 50. The execution of the automatic braking is one of the collision avoidance assist operation for avoiding a collision between the host vehicle and the object. Then, the process proceeds to S495, and the CPU ends the present routine once. On the other hand, when the time to collision TTC is longer than the collision determination time threshold TTCth, the process directly proceeds from S460 to S495, and the CPU ends the present routine once.

Setting of Threshold

By the way, the setting input device 94 includes a display touch panel that displays a touch button and displays a menu screen 500 illustrated in FIG. 5A at normal times.

If the driver touches a display button 501 to change a "collision avoidance assist timing", the setting input device 94 displays a collision avoidance assist timing selection screen 510 illustrated in FIG. 5B. The driver touches a display button of one of "early 511, normal 512 and late 513" from the selection screen 510. By this means, the reference threshold TTCthStd for determining the collision avoidance assist timing can be changed by the routine indicated in FIG. 6 to be described later. Note that in a default state (initial state), the "normal 512" is automatically selected, and a standard value TStdN is set at the reference threshold TTCthStd and stored in the non-volatile memory of the driver assist ECU 100.

If the driver touches a display button 502 on the menu screen 500 to change the "corrected collision avoidance assist timing", the setting input device 94 displays a corrected collision avoidance assist timing selection screen 520 illustrated in FIG. 5C. The driver touches a display button of one of "early 521, normal 522 and late 523" from the selection screen 520. By this means, the timing correction time dTTCth for determining the corrected collision avoidance assist timing can be changed by the routine indicated in FIG. 6 to be described later. Note that in a default state (initial state), the "normal 522" is automatically selected, and a "value of 2/3 times of a correction margin TS" is set at the timing correction time dTTCth and stored in the non-volatile memory of the driver assist ECU 100. The correction margin TS is a value also referred to as a "difference value TS", which will be described later in detail.

If the driver touches a display button 503 on the menu screen 500 to change a "speed limit decrease threshold", the setting input device 94 displays a speed limit decrease threshold selection screen 530 illustrated in FIG. 5D. The driver can change the speed limit decrease threshold VLTth through the routine indicated in FIG. 6 to be described later by touching a display button of one of "large 531, normal 532 and small 533" from the selection screen 530. Note that in a default state (initial state), the "normal 532" is automatically selected, and a standard value VLTthN is set at the speed limit decrease threshold VLTth and stored in the non-volatile memory of the driver assist ECU 100.

If the driver touches a display button 504 on the menu screen 500 to change a "length of a collision avoidance assist timing correction period", the setting input device 94 displays an assist timing correction period length selection screen 540 illustrated in FIG. 5E. The driver can change the change time threshold Tth through the routine indicated in FIG. 6 to be described later by touching a display button of one of "long 541, normal 542 and short 543" from the selection screen 540. Note that in a default state (initial state), the "normal 542" is automatically selected, and a standard value TthN is set at the change time threshold Tth and stored in the non-volatile memory of the driver assist ECU 100.

Figure 6:
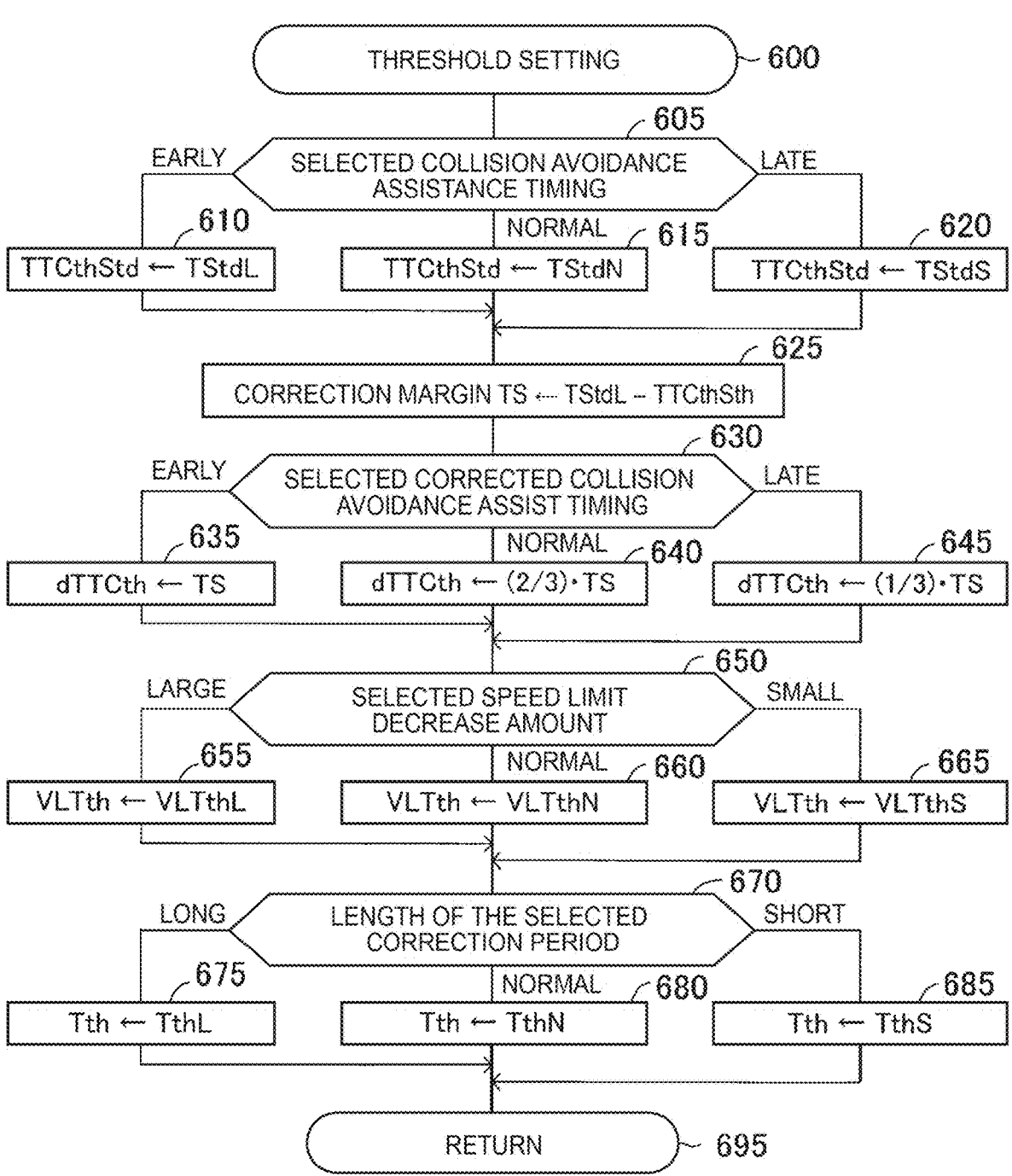
FIG. 6 indicates a routine to be executed by the CPU of the driver assist ECU illustrated in FIG. 1.

At a predetermined timing, the CPU starts processing from S600 in FIG. 6, and the process proceeds to S605. In S605, the CPU determines which of "early 511, normal 512, and late 513" is selected as the display button on the collision avoidance assist timing selection screen 510 illustrated in FIG. 5B.

When "early 511" is selected, the CPU performs processing in S610 described below. When "normal 512" is selected, the CPU performs processing in S615 described below. When "late 513" is selected, the CPU performs processing in S620 described below. After the CPU performs one of the processing, the process proceeds to S625.

S610: The CPU sets a value (first value) TStdL corresponding to a relatively long time at the reference threshold TTCthStd and stores the value in the non-volatile memory of the driver assist ECU 100.

S615: The CPU sets a standard value TStdN corresponding to a medium time at the reference threshold TTCthStd and stores the value in the non-volatile memory of the driver assist ECU 100.

S620: The CPU sets a value (second value) TStdS corresponding to a relatively short time at the reference threshold TTCthStd and stores the value in the non-volatile memory of the driver assist ECU 100.

Note that the respective values are set such that the following inequation is satisfied.

$$TStdL > TStdN > TStdS$$

When the process proceeds to S625, the CPU stores a value (TStdL−TTCthStd) obtained by subtracting the "reference threshold TTCthStd set in one of S610 to S620" from the "value TStdL corresponding to the relatively long time" in the non-volatile memory of the driver assist ECU 100 as the correction margin TS. Then, the process of the CPU proceeds to S630.

The CPU determines which of "early 521, normal 522, and late 523" is selected as the display button on the corrected collision avoidance assist timing selection screen 520 illustrated in FIG. 5C in S630.

When "early 521" is selected, the CPU performs processing in S635 described below. When "normal 522" is selected, the CPU performs processing in S640 described below. When "late 523" is selected, the CPU performs processing in S645 described below. After the CPU performs one of the processing, the process proceeds to S650.

S635: The CPU sets the correction margin TS corresponding to a relative long time at the timing correction time dTTCth and stores the value in the non-volatile memory of the driver assist ECU 100.

S640: The CPU sets a "value that is $\frac{2}{3}$ times of the correction margin TS" that is a value corresponding to a medium time at the timing correction time dTTCth and stores the value in the non-volatile memory of the driver assist ECU 100.

S645: The CPU sets a "value that is $\frac{1}{3}$ times of the correction margin TS" that is a value corresponding to a relatively short time at the timing correction time dTTCth and stores the value in the non-volatile memory of the driver assist ECU 100.

Note that the correction margin TS is a positive value, and thus, naturally an inequation "TS>($\frac{2}{3}$)·TS>($\frac{1}{3}$)·TS" is satisfied for the respective values.

As a result of the timing correction time dTTCth being set in this manner, the corrected determination time threshold (=TTCthStd+dTTCth) changes in a range from the "value TStdL corresponding to the relatively long time" to the "reference threshold TTCthStd (accurately, TTCthStd+($\frac{1}{3}$) ·TS)" set in one of S610 to S620". Thus, a start timing of the collision avoidance assist operation is set at the earliest timing among timings from a start timing of the collision avoidance assist operation desired by the driver during normal driving to a start timing of the collision avoidance assist operation allowed in a system during a period (correction period) until the change time threshold Tth has elapsed since the speed limit had decreased by an amount greater than the speed limit decrease threshold VLTth. Thus, in the correction period, while the collision avoidance assist operation is started at a timing earlier than the start timing of the collision avoidance assist operation desired by the driver upon normal driving, a situation in which the collision avoidance assist operation is started at a timing earlier than necessary is avoided.

The CPU determines which of "large 531, normal 532, and small 533" is selected as the display button on the speed limit decrease threshold selection screen 530 illustrated in FIG. 5D in S650.

When "large 531" is selected, the CPU performs processing in S655 described below. When "normal 532" is selected, the CPU performs processing in S660 described below. When "small 533" is selected, the CPU performs processing in S665 described below. After the CPU performs one of the processing, the process proceeds to S670.

S655: The CPU sets a relatively large value VLTthL at the speed limit decrease threshold VLTth and stores the value in the non-volatile memory of the driver assist ECU 100.

S660: The CPU sets a medium value VLTthN at the speed limit decrease threshold VLTth and stores the value in the non-volatile memory of the driver assist ECU 100.

S665: The CPU sets a relatively small value VLTthS at the speed limit decrease threshold VLTth and stores the value in the non-volatile memory of the driver assist ECU 100.

Note that the respective values are set such that the following inequation is satisfied.

$$VLTthL > VLTthN > VLTthS$$

The CPU determines which of "long 541, normal 542, and short 543" is selected as the display button on the assist timing correction period length selection screen 540 illustrated in FIG. 5E in S670.

When "long 541" is selected, the CPU performs processing in S675 described below. When "normal 542" is selected, the CPU performs processing in S680 described below. When "short 543" is selected, the CPU performs processing in S685 described below. After the CPU performs one of the processing, the process proceeds to S695, and the CPU ends the present routine once.

S675: The CPU sets a value TthL corresponding to a relatively long time at the change time threshold Tth and stores the value in the non-volatile memory of the driver assist ECU 100.

S680: The CPU sets a value TthN corresponding to a time having a medium length at the change time threshold Tth and stores the value in the non-volatile memory of the driver assist ECU 100.

S685: The CPU sets a value Tths corresponding to a relatively short time at the change time threshold Tth and stores the value in the non-volatile memory of the driver assist ECU 100. Note that the respective values are set such that the following inequation is satisfied.

TthL>TthN>TthS

As described above, the device DS changes the collision determination time threshold TTCth to the corrected determination time threshold (=TTCthStd+dTTCth) when the current speed limit is lower than the past speed limit by an amount greater than the speed limit decrease threshold VLTth. By this means, the collision determination condition for the collision avoidance assist operation is changed to a condition that is more easily satisfied. Even if the driver of the host vehicle overlooks decrease of the speed limit and is late in addressing rapid deceleration of the preceding vehicle, the collision determination condition is satisfied early, and the collision avoidance assist operation is executed early. It is therefore possible to prevent the host vehicle from extremely approaching the preceding vehicle.

Note that the present disclosure is not limited to the above-described embodiment and modifications, and various modifications can be employed within the scope of the present disclosure. For example, the CPU may recognize the current speed limit by receiving the speed limit from roadside machine via the communication ECU 90 in S210. Further, the present disclosure can be applied to a host vehicle in a state where a driving mode transitions from autonomous driving to driving by the driver in an autonomous driving vehicle. While the number of types of values to be changed by operation of the setting input device 94 is three, N types (N is an integer equal to or greater than 2) of values may be changed. Further, the CPU determines whether the current speed limit is higher than the past speed limit when determination of "No" is made in S330. The process of the CPU may proceed to S340 when the current speed limit is higher than the past speed limit, and may proceed to S395 when the current speed limit is not higher than the past speed limit.

What is claimed is:

1. A driver assistance device for a vehicle, the driver assistance device comprising:

a controller configured to perform a collision avoidance assist operation when a collision determination condition is satisfied, the collision avoidance assist operation being an operation for avoiding a collision between a host vehicle and an object, and the collision determination condition being a condition that is satisfied when the host vehicle is predicted to collide with the object; and a setting input device that is operated by an occupant of the host vehicle, wherein the controller is configured to recognize a speed limit applied to a lane on which the host vehicle is traveling, when a current speed limit is lower than a past speed limit, change the collision determination condition to a condition that is easily satisfied, in order for the collision avoidance assist operation to be performed at an earlier timing than when the current speed limit is not lower than the past speed limit, the current speed limit being a speed limit newly recognized at a current point in time, and the past speed limit being a speed limit that had been recognized until immediately before the current point in time, calculate a time to collision that is a time remaining until the host vehicle collides with the object, determine that the collision determination condition is satisfied when the time to collision becomes equal to or less than a collision determination time threshold, change, based on an input to the setting input device, the collision determination time threshold as a reference threshold between a first value and a second value smaller than the first value, the collision determination time threshold being a threshold used to determine whether the collision determination condition is satisfied when the collision determination condition is not changed, change the collision determination condition to the condition that is easily satisfied, by changing the collision determination time threshold to a value obtained by adding a timing correction time to the reference threshold, and change the timing correction time based on the input to the setting input device, and the timing correction time is set to a value equal to or less than a difference value obtained by subtracting the reference threshold from the first value.

2. The driver assistance device according to claim 1, wherein:

the controller is configured to when the current speed limit is lower than the past speed limit by a speed limit decrease threshold or more, change the collision determination condition to the condition that is easily satisfied; and the controller is further configured to change the speed limit decrease threshold based on the input to the setting input device.

3. The driver assistance device according to claim 1, wherein:

the controller is configured to when an elapsed time from a point in time when the collision determination condition was changed to the condition that is easily satisfied reaches a change time threshold, return the collision determination condition to the condition before the change; and the controller is further configured to change the change time threshold based on the input to the setting input device.

4. The driver assistance device according to claim 1, wherein the controller is further configured to change how easily the condition that is easily satisfied is satisfied, based on the input to the setting input device.

* * * * *